Feb. 28, 1950   A. B. SMITH   2,499,117
FISHING HARNESS
Filed Nov. 25, 1947
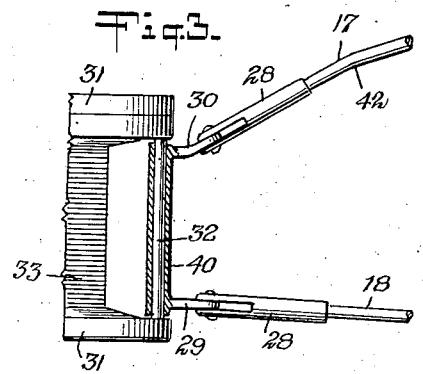
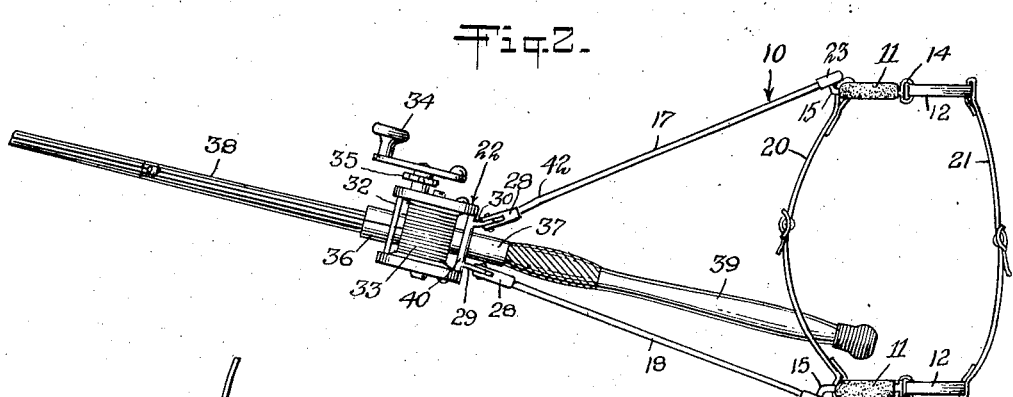
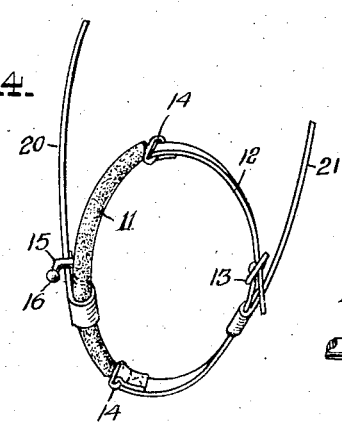
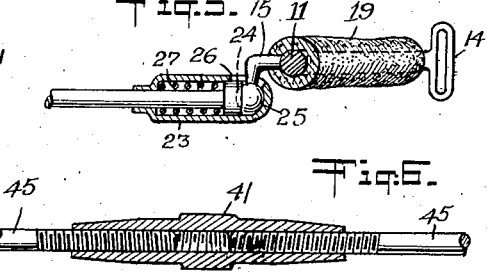
INVENTOR
Arthur B. Smith
BY
Munn, Liddy & Glaccum
ATTORNEYS Patented Feb. 28, 1950

2,499,117

UNITED STATES PATENT OFFICE 2,499,117

FISHING HARNESS

Arthur B. Smith, Bay Shore, N. Y.

Application November 25, 1947, Serial No. 787,894

5 Claims. (Cl. 224—5)

My invention relates to fishing equipment and more specifically to a fishing harness that incorporates many new and novel structural features.

The principal objective of my invention is to provide a harness that may be associated with a conventional fishing reel assembly to enable a person to fish with one hand.

Heretofore, the big disadvantage of most fishing harnesses was that they merely served to support the fishing rod and did not provide any suitable means for manipulating the rod, which is imperative in any type of fishing. By providing rigid connections between the reel and the harness I have overcome this disadvantage and a one armed fisherman using my invention has as much control over the movement of the rod as a normal person has with two hands.

Furthermore, the rigid connections enable a fisherman to control the movement of the rod through the use of his shoulders and by turning his shoulders he can move the rod to follow the run of the fish.

A further advantage of my device is that the rigid connections also assure the transmittal of sensitive movements between the line and the shoulders, enabling the user to feel the strike of the fish.

Another advantage of my device is that it may be used for all types of fishing, even when fishing for large game fish where it is necessary to pump the rod.

A further feature of my device is that it may be readily and quickly attached to any conventional fishing reel assembly.

Another advantage of my invention is the provision of means for detachably securing the reel assembly to the harness in such a manner that it and the rod can be quickly attached or detached.

Further advantages and features of my invention will be apparent as I proceed with the description.

With reference to the drawings.

Figure 1 shows a perspective view of my harness secured to a person;

Figure 2 shows a plan view of my harness attached to a reel assembly;

Figure 3 shows a plan view partially in section of the reel attachments;

Figure 4 shows a perspective view of one of the shoulder attachments;

Figure 5 shows a sectional plan view of the ball and socket means for attaching and connecting rods to the shoulder members; and, Figure 6 shows a modification of a connecting rod incorporating adjusting means.

In Figure 1, I show my fishing harness 10 secured to a person in position for use. The harness 10 includes two shoulder or control members 11 which are provided with belt 12 and buckle 13 for securing the members to the shoulders of the wearer. The shoulder members 11 are identical in shape and construction and like numbers will be applied to respective portions of each member. The shoulder members 11 are arcuate in shape having attaching elements 14 at their upper and lower ends. Located at approximately the center of the front portion of the shoulder members is a projection 15 terminating in a ball element 16, that forms part of the ball and socket arrangement for securing the braces 17 and 18 to the shoulder members 11. The shoulder members 11 are encased in padding 19 to prevent chafing and to assure a comfortable fitting to the wearer. The individual shoulder members 11 may be adjusted through straps 12 and the members are held in place on the body of the wearer by front and rear straps 20 and 21 respectively, which may be adjusted so that the harness 10 may be snugly secured to the wearer's body.

Connecting the harness to the reel assembly frame 22 are two rigid connecting braces 17 and 18. Positioned to the upper ends of the braces are slidably mounted sockets 23. The upper ends of the braces and sockets are equipped with curved surfaces 24 and 25 respectively, so that when the ball element 16 is inserted in the opening 26 in the socket 23 it will be securely held between surfaces 24 and 25. The socket 23 is also equipped with a spring 27 mounted around the upper portion of the braces which furnishes the necessary tension for holding the ball element in place. The lower ends of the braces are equipped with bifurcated connections 28 which are pivotally connected to spaced lugs 29 and 30 which are mounted on the reel assembly frame 22 at the rear thereof. The reel assembly is of the conventional type having side plates 31 held together by pillars 32 with a spool 33 being mounted between the plates 31. The assembly is also equipped with a handle 34 and star drag 35 for controlling the movement of the spool 33. Upper and lower sockets 36 and 37 respectively are also provided for mounting the tip and butt 38 and 39 respectively.

In order to connect the rods 17 and 18 to the frame 22, a hollow sleeve 40 is provided with a pair of spaced lugs 29 and 30 which are integral with the sleeve 40. One of the pillars 32 may be removed and then replaced in the frame 22, with the sleeve 40 positioned around the pillar 32 so that it is free to rotate on the pillar. It can be seen from this arrangement that whereas there will be free vertical movement between the braces 17 and 18 and reel frame 22 due to the pivotal connections there will be no lateral movement except when the shoulders of the wearer are turned. Such construction also prevents the reel frame 22 from turning and assures a maximum of control over the fishing equipment through shoulder movement.

In Figure 6, I have shown a modification which may be incorporated in the connecting braces consisting of threaded brace sections 45, and a turnbuckle 41 connecting the sections, thereby enabling the shortening and/or lengthening of the braces to obtain the desired adjustment.

As shown in the preferred version of my invention, in Figure 2, the brace 17 is equipped with an offset 42 and likewise its corresponding connecting lug 30 is also provided with an offset. This is necessary when the butt 39 is mounted in a socket 43 at the side of the user. This enables the user to control the reel assembly through the handle 34 and star drag 35 while the control over the movement of the tip 38 can be transmitted through various shoulder movements. In the event it is desired to use my invention for game fishing, both braces 17 and 18 would be provided with offsets so that the butt 39 can be mounted in a socket positioned at the person's mid point. As can be readily seen the ball and socket connection provides a simple and efficient means for attaching and detaching the braces and reel assembly to the harness. It is realized, of course, that the braces could be integral with the shoulder members, if desired, without deviating from the objectives of the invention. By providing sleeves of various lengths it will be possible to adapt my invention to all types and sizes of fishing reels.

Although my invention has been primarily designed for use by persons who are handicapped and who have the use of only one hand, obviously, it has many advantages and features that will appeal to the average fisherman as it assures him positive control over his fishing equipment and at the same time allows him the free use of one hand.

While the invention has been described in detail and with respect to a present preferred form which the invention may assume, it is not to be limited to such details and form since many changes and modifications may be made in the invention without departing from the spirit and scope of the invention in its broadest aspects. Hence it is desired to cover any and all forms and modifications of the invention which may come within the language or scope of any one or more of the appended claims.

I claim:

1. The combination with a fishing rod, of a harness adapted to fit on the shoulders of the user, forwardly and downwardly converging rigid braces arranged between the rod and the shoulder portions of the harness, means carried by the fishing rod which are pivotally connected with the adjacent lower ends, respectively, of said braces, and the upper ends of the braces pivotally connected with shoulder portions, respectively, of the harness.

2. The combination with a fishing rod and reel frame on the rod, of a harness adapted to fit on the shoulders of the user, forwardly and downwardly converging rigid braces arranged between said frame and the harness, means on said frame at its rear pivotally connected with the adjacent lower ends, respectively, of said braces, and rigid means on the harness at the front of the user's shoulders, respectively, pivotally connected with the upper ends, respectively, of the braces.

3. The combination with a fishing rod reel frame, of a harness having control members adapted to fit on the user's shoulders, respectively, forwardly and downwardly converging rigid braces arranged between the frame and the control members of the harness, spaced lugs projecting from the frame at the rear, the lower ends of the braces pivotally connected with said lugs respectively, and means pivotally connecting the upper ends of the braces with said control members respectively.

4. The combination as set forth in claim 3, wherein said last means consists of spring loaded ball and socket connections.

5. The combination as set forth in claim 4, wherein the ball of each of said connections is detachable from the socket.

ARTHUR B. SMITH.

REFERENCES CITED

The following references are of record in the file of this patent:

UNITED STATES PATENTS

| Number | Name | Date |
|---|---|---|
| 446,487 | Vannatta | Feb. 17, 1891 |
| 1,198,202 | Drinkard | Sept. 12, 1916 |
| 1,688,148 | Martin | Oct. 16, 1928 |
| 2,142,887 | Dixon | Jan. 3, 1939 |
| 2,223,253 | Hamilton | Nov. 26, 1940 |

FOREIGN PATENTS

| Number | Country | Date |
|---|---|---|
| 114,734 | Great Britain | Apr. 18, 1918 |